Dec. 1, 1936.  W. NACKEN  2,062,723
MULTIPLE WIRE DRAWING MACHINE
Filed Dec. 9, 1935
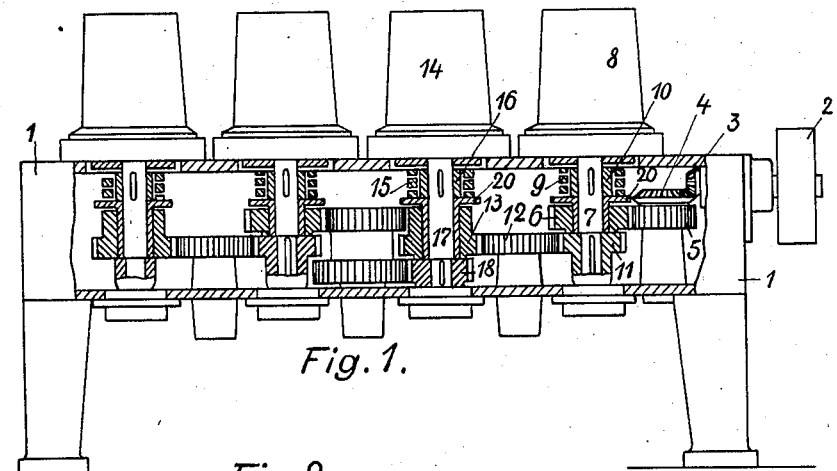
Fig. 1.
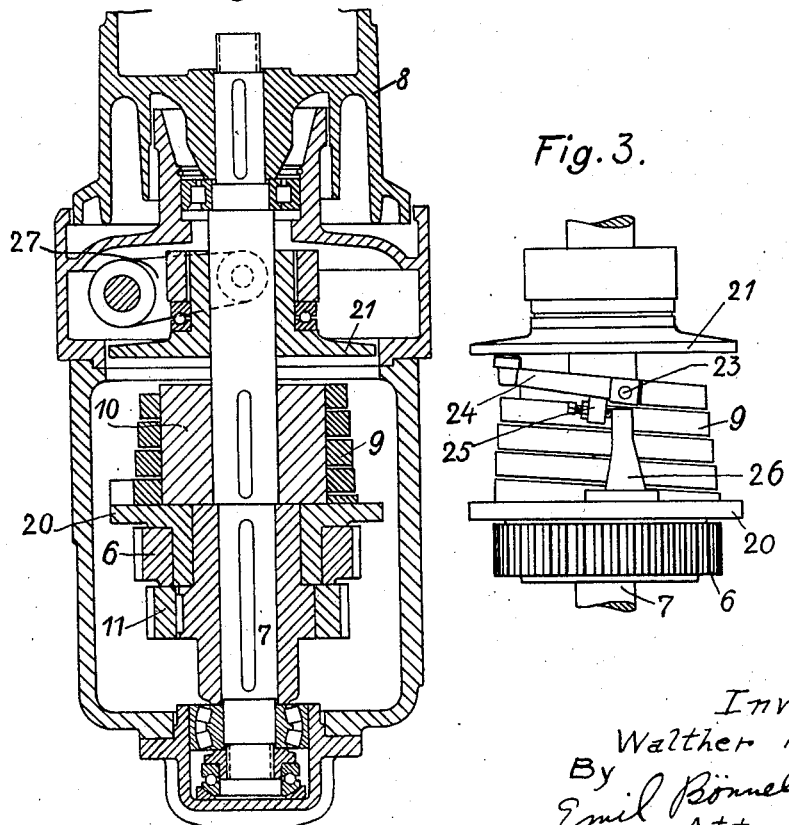
Fig. 2.
Fig. 3.
Inventor:
Walther Nacken
By Emil Bönnelyche
Attorney

UNITED STATES PATENT OFFICE 2,062,723

MULTIPLE WIRE DRAWING MACHINE

Walther Nacken, Gruna, Germany

Application December 9, 1935, Serial No. 53,647
In Germany November 14, 1934

5 Claims. (Cl. 205—14)

This invention relates to multiple wire drawing machines.

In non-slip multiple wire drawing machines the wire is prevented from slipping on the drawing drums by arranging it in numerous windings on each drum and drawing off the individual windings upwardly from the drum by means of a guiding device to pass them to the next drum, such as disclosed in my prior Patent No. 1,914,833 issued June 20, 1933.

In wire drawing machines having a single drive for all the drums, each of which is provided with a clutch, the drums to which the wire is passed first can be stopped while the other drums continue to move, it being necessary, however, when stopping a drum to stop also all other drums to which the wire has passed before it reached the drum to be disengaged as otherwise the wire would be damaged and become tangled.

To improve the known wire drawing machines in this respect the invention proposes to transmit the driving power from one drum shaft to the next along the series, to provide each gear which transmits driving power from one drum shaft to the next with a clutch and to apply the external driving power to the drum on which the wire is wound last and which rotates at highest speed.

By way of example, one embodiment of the invention is illustrated in the accompanying drawing, in which Figure 1 is a front view of the most important parts of a non-slip multiple wire drawing machine; Fig. 2, a section of a drum drive; and Fig. 3, a front view of a spring band coupling.

Referring to the drawing, the box-like machine frame 1 contains the driving gear for the drawing drums, and driving power is supplied to the machine by the pulley 2 or an electromotor, etc.

The pulley 2 is disposed with its shaft on the machine frame 1 and transmits its driving power to a bevel gear 3 which in turn transmits its motion to a bevel gear 4 firmly connected with a spur gear 5 whose teeth engage a spur gear 6 and drive it. The spur gear 6 is firmly connected with the driving pulley 20 of a friction band clutch. The pulley 20 is loosely rotatable on the shaft 7 or on the hub of an adjacent spur gear 11 firmly connected with the shaft 7, to the upper end of which the drum 8 is secured. Directly above the driving pulley 20 the boss 10 of the friction band coupling is secured to the shaft 7 and loosely surrounded by the clutch spring 9. The lower end of the spring 9 is firmly connected with the driving pulley 20 while the upper end thereof is provided with a clip 23 in which an elbow lever 24 is movably disposed. One arm of the elbow lever 24 carries an adjustable set screw 25 whose free end engages a post 26 screwed to the pulley 20. The other arm of the elbow lever 24 abuts against a disc 21 which can be displaced in known manner along the shaft 7 by a forked lever 27. If the disc 21 is pushed by the lever 27 in the direction of the driving pulley 20, the lever 24 will tension the spring 9 so that it will firmly clutch the boss 10 and thus transmit driving power from the gear 6 and the pulley 20 to the boss 10 which in turn will drive the shaft 7 with the drum 8 and the spur gear 11.

By means of an intermediate spur gear 12 the spur gear 11 transmits the driving power to a loosely running spur gear 13 co-operating with the next drum 14. In the manner described above, the spur gear 13 is connected with the spring 15 of the spring band clutch appertaining to the drum 14, and a boss 16 is fast on the shaft 17 which carries the drum 14. The shaft 17 carries a spur gear 18 by means of which power is transmitted to the other drums further to the left in Fig. 1.

The drive of the other drums is of similar design. Power is transmitted through the machine in such a manner that the drive is always transmitted from one drum to the next to the left, through a clutch and gears whereby disengagement of a drum by means of its clutch interrupts transmission of power not only to the particular drum concerned but, simultaneously, to the next gear to the left, that is, away from the drive 2.

In the construction shown driving power is supplied on that side of the machine where the drums have maximum speed to wind up the drawn wire. As the speed increases from drum to drum and the clutch having to transmit the greatest power rotates at the highest speed, this clutch may have the same size as all the other clutches which have to transmit smaller powers at lower speeds. It is therefore possible, notwithstanding the different powers to be transmitted by the various clutches, to provide all drums with clutches of the same size or torque transmitting capacity, whereby the construction of the machine is considerably facilitated.

This advantage afforded by the gear described can be enhanced still more by employing drums of different size, i. e., imparting a smaller diameter to those which have to wind up the thinner wire portions, so as to further increase the speed of those drums compared with that of the others.

In this case it is even possible to make the clutches which have to drive the most rapidly rotating drums smaller than the others.

The driving energy from the motor to the pulley 2 is to be maintained to such a degree that it is sufficient to drive all the drums 8, 14, etc. Accordingly the entire energy will be converted from the gear 5 to the gear 6 while the energy converted from gear 12 to gear 13 is only sufficient in order to drive the three remaining drums. On the shaft of the next drum a still smaller amount of energy must be converted and finally on the last shaft only such energy is necessary in order to drive only the last drum. The energy converted from one drum shaft and another drum shaft thus decreases uniformily from the one end to the other end.

In the same manner as the energy, also the speed of revolution of the drums 8, 14, etc. and their shafts will be lowered so that the moments of rotation, which are converted from the single drive wheels to the drum shafts by means of the clutches are approximately the same.

Instead of spring band clutches other types of clutches, such as friction cone or claw clutches, may be used. To save overall height the clutches may be placed inside the drums.

The arrangement of the gear in a box-like portion of the machine frame affords the advantage that the gear box can be filled with oil which, owing to the rapid rotation of all machine parts within the box, is splashed around in the latter so that the elevated clutches are lubricated.

I claim:—

1. A multiple wire drawing machine comprising in combination, a series of drawing drums, corresponding series of shafts for said drawing drums including a gear on each shaft for transmitting power from shaft to shaft along the series and for rotating said shafts at speeds increasing from shaft to shaft from one end to the other of the series, drive means engaging the highest speed drum shaft, and clutches in said transmission means distributed one between each gear and the next drum shaft, said clutches being so arranged that disengagement of any one of them will interrupt the drive of all the drum shafts of the series beyond the disengaged clutch in the direction away from the drive means.

2. A multiple wire drawing machine comprising in combination, a series of drawing drums, a corresponding series of shafts for said drawing drums including a gear on each shaft for transmitting power from shaft to shaft along the series and for rotating said shafts at speeds increasing from shaft to shaft from one end to the other of the series, drive means engaging the highest speed drum shaft, and clutches in said transmission means distributed one between each gear and the next drum shaft, said clutches being so arranged that disengagement of any one of them will interrupt the drive of all the drum shafts of the series beyond the disengaged clutch in the direction away from the drive means and the clutches being all of equal torque transmitting capacity.

3. A multiple wire drawing machine comprising in combination, a series of drawing drums, a corresponding series of shafts for said drawing drums including a gear on each shaft for transmitting power from shaft to shaft along the series and for rotating said shafts at speeds increasing from shaft to shaft from one end to the other of the series, drive means engaging the highest speed drum shaft, and clutches in said transmission means distributed one between each gear and the next drum shaft, said clutches being so arranged that disengagement of any one of them will interrupt the drive of all the drum shafts of the series beyond the disengaging clutch in the direction away from the drive means and the clutches being all of equal torque transmitting capacity and the torque transmitting capacities of said clutches being in inverse proportion to the power transmitted thereby'

4. A multiple wire drawing machine comprising in combination, a series of drawing drums, a corresponding series of shafts for said drawing drums including a gear on each shaft for transmitting power from shaft to shaft along the series and for rotating said shafts at speeds increasing from shaft to shaft from one end to the other of the series, drive means engaging the highest speed drum shaft, and clutches in said transmission means distributed one between each gear and the next drum shaft, said clutches being so arranged that disengagement of any one of them will interrupt the drive of all the drum shafts of the series beyond the disengaged clutch in the direction away from the drive means, and a frame having an oil retaining housing in which said shafts, gears and clutches are enclosed.

5. A multiple wire drawing machine comprising a series of drums, mounted on a series of parallel shafts, a clutch member fast to each shaft, a gear on each shaft and freely rotatable with respect to said clutch member and having a clutch part engageable with said clutch member, a second gear fast to each shaft, means for engaging the clutch member and clutch part, the fast gear transmitting power to the freely rotatable gear of the adjacent shaft, means for driving the freely rotatable gear of the final drum of the series, and means for engaging corresponding clutch members and clutch parts whereby power is transmitted from the final drum to the preceding drum in the series, the disengagement of any clutch in the series also stopping the preceding drums.

WALTHER NACKEN.